Patented Feb. 21, 1950

2,498,390

UNITED STATES PATENT OFFICE 2,498,390

PREPARATION OF 7-DEHYDRO-CHOLESTERYL ESTERS

Seymour Bernstein and Karl J. Sax, Pearl River, N. Y., assignors to American Cyanamid Company, New York, N. Y., a corporation of Maine No Drawing. Application January 14, 1948, Serial No. 2,335

8 Claims. (Cl. 260—397.2)

The present invention relates to an improved method of preparing 7-dehydrocholesteryl esters. Ziegler et al. [Ann., vol. 551, 80 (1942)] describes the action of various N-halogenated molecules upon unsaturated substances. He found that compounds such as N-bromosuccinimide and N,o,p-trichloroacetanilide can be used to brominate unsaturated compounds such as cyclohexene and cholesteryl esters. The bromo compounds, when treated with an amine, split out the halogen acid as a salt of the amine and form a compound having a conjugated double bond system.

In a co-pending application of one of us, Serial Number 714,662, filed December 6, 1946, a method of obtaining 7-dehydrocholesteryl esters was described in which the removal of the halogen acids was carried out in the presence of a hydrocarbon solvent. In previous methods of removing the halogen acids as an amine salt, the amine was used as a dehydrohalogenating agent and also as a solvent for the process. The use of a solvent in this step permits the use of a smaller amount of relatively expensive amines and a larger amount of the relatively cheap hydrocarbon solvents.

We have found that if a portion of a tertiary amine is added to the reaction mixture at the end of the bromination step while the mixture is still hot, increased yields of highly purified product are obtained. It may be that the presence of the amine causes the dehydrohalogenating reaction to begin to take place at once, preventing the formation of undesirable cholesteryl derivatives by side reactions. While the applicants do not wish to be bound by this theory, they have found that highly purified products can be obtained in good yield by following this procedure.

In carrying out the bromination step to obtain 7-bromocholesteryl esters the most desirable esters are the benzoate and the acetate; however, other esters of cholesterol such as the propionate, butyrate, nicotinate, chlorobenzoate, nitrobenzoate and the like can be used. In carrying out the reaction we prefer to use a saturated hydrocarbon solvent such as petroleum ether, cyclohexane, and the like or a completely halogenated hydrocarbon such as carbon tetrachloride. Unsaturated hydrocarbons show a tendency to lower the yield. To insure the absence of unsaturated compounds, we prefer to treat the desired solvent with concentrated sulfuric acid and acidic potassium permanganate, prior to use, to remove unsaturated derivatives.

The conversion of the cholesteryl esters to 7-bromocholesteryl esters is best carried out in the presence of the heat and light emitted by one or more electrical light sources producing predominately visible light. These may take the form of photoflood or photospot bulbs placed relatively close to the reaction mixture. The reaction is generally completed within the period of from 30 seconds to about 1 hour. At about the time the bromination is complete, a small amount of a tertiary amine such as 2,4,6-collidine, dimethylaniline, pyridine and the like is added to the hot reaction mixture.

After allowing the initial reaction mixture to cool, the succinimide is removed and the solvent is then removed from the reaction mixture by distillation in vacuo. The residue is dissolved in a second solvent such as xylene, toluene, n-octane, and the like, along with an additional small amount of said tertiary amine. The preferred solvents are those having a boiling point range between 100° C. and 150° C. The reaction is completed within a period of from 5 minutes to about 2 hours at the above temperature range.

The process is carried out using various esters hereinbefore mentioned. Should 7-dehydrocholesterol itself be desired it can be obtained by hydrolyzing the 7-dehydrocholesteryl ester with a solution of an alkali metal hydroxide.

The invention will be described with greater particularity in the following examples which illustrate the preferred method of preparing 7-dehydrocholesteryl esters from the corresponding cholesteryl ester. Parts are by weight unless otherwise indicated.

Example 1

A mixture of 4.9 g. (0.01 mol) of cholesteryl benzoate, 2.14 g. (0.012 mol) of N-bromosuccinimide in 50 ml. petroleum ether (boiling point 55°–60° C., purified by shaking successively with concentrated sulfuric acid and acidic potassium permanganate to remove unsaturated compounds) was refluxed 30 minutes by the heat and light from two RSP-2 photospot lamps (General Electric Co. 115 volts) placed two inches from the reaction flask. Two ml. of 2,4,6-collidine (boiling point 170° C.) was added to the still refluxing mixture which was then cooled, filtered by suction to remove succinimide and any unreacted N-bromosuccinimide and distilled in vacuo at —10° to +10° C. to remove the petroleum ether. The residual oil which has an orange to dark red color, may crystallize somewhat if distillation is carried out at the lower temperatures for a long period of time. To the 7-bromocholesteryl benzoate-collidine mixture in the reaction flask was added 25 ml. of xylene (boiling point 138°–142° C.) previously mixed with 1 ml. of collidine. The solution was refluxed for 15 minutes in a nitrogen atmosphere, during which time part of the collidine crystallized out as the hydrobromide salt. The solution was cooled, anhydrous magnesium sulfate was added and the slurry was filtered by suction. The red solution was distilled in vacuo to remove the xylene. Near the end of the distillation crystals began to appear. The reaction mixture was diluted with 35 ml. of acetone and the mixture cooled quickly to 15° C. The crystals obtained were removed by filtration and washed with acetone. A yield of 2.52 g. of 7-dehydrocholesteryl benzoate having a melting point of 128°–132° C., cloudy melt clearing at 158° C. was obtained. An ultra violet spectroscopic analysis showed the product to be at least 80.4% pure. On the basis of this analysis the yield was 41.5%.

The material was recrystallized from acetone several times to achieve maximum purity, wt. 1.36 g., melting point 139°–141° C., clearing at 188.5° C., 27.9% yield.

Example 2

A mixture of 19.6 g. (0.04 mols) of cholesteryl benzoate, 8.55 g. (0.048 mol) of N-bromosuccinimide and 200 ml. of petroleum ether (boiling point 64°–65° C. purified by shaking successively with concentrated sulfuric acid and acidic permanganate to remove unsaturated compounds) was refluxed for 4 minutes by the light and heat of two RSP-2 photospot bulbs placed two inches from the reaction vessel. To the boiling solution was added 8 ml. of 2,4,6-collidine and, after cooling, the mixture was filtered by suction to remove the insoluble succinimide. The solution was then distilled in vacuo at −10° to +10° C. to remove the petroleum ether. A dark red oil containing the collidine and the crude 7-bromocholesteryl benzoate remained in the flask. The oil was dissolved in a mixture of 100 ml. of xylene (boiling point 138° to 142° C.) and 4 ml. of 2,4,6-collidine and refluxed in a nitrogen atmosphere for 15 minutes. After cooling, anhydrous magnesium sulfate was added and the slurry was filtered with suction and distilled in vacuo. The partially crystalline red oil was treated with 100 ml. of acetone and cooled in an ice bath. A yield of 12.48 g. of 7-dehydrocholesteryl benzoate having a melting point of 122°–128° C., cloudy melt clearing at 152° C. was obtained. Spectroscopically the material was 64.5% pure. The yield was 41.3%.

After four recrystallizations from acetone there remained 5.08 g., melting point 138°–140.5° C., clearing at 187.5° C., and an additional 0.84 g., melting point 138°–140.5° C., clearing at 185.5° C. was recovered from the mother liquors. The overall yield of pure 7-dehydrocholesteryl benzoate was 30.3%.

Example 3

To 98 g. (0.2 mol) of cholesteryl benzoate, and 42.8 g. (0.24 mol) of N-bromosuccinimide was added 1 liter of carbon tetrachloride and the mixture refluxed for two minutes in the manner described in Example 1. Instead of collidine, 40 ml. of dimethylaniline was used, a small amount being added to the hot reaction mixture before cooling. The reaction mixture of 7-bromocholesteryl benzoate-dimethylaniline and 250 ml. of xylene containing 10 ml. of dimethylaniline was refluxed for 10 minutes. A yield of 32.4 g. of 80.2% pure 7-dehydrocholesteryl benzoate was obtained. This was a yield of 26.8%.

Example 4

A mixture of 4.9 g. of cholesteryl benzoate 2.14 g. of N-bromosuccinimide and 50 ml. of carbon tetrachloride was refluxed for 2 minutes. After adding 2 ml. of 2,4,6-collidine to the hot reaction mixture and following the procedure of Example 1, a yield of 2.8 g. of 55.9% pure 7-dehydrocholesteryl benzoate was obtained. This was a yield of 32%.

Example 5

A reaction mixture identical with that of Example 1 was refluxed for 4 minutes and 2 ml. of the tertiary amine, dimethylaniline, added to the hot mixture. On completing the reaction in the usual manner (Example 1) a yield of 1.84 g., of 82% pure 7-dehydrocholesteryl benzoate was obtained. This was a yield of 30.9%.

Example 6

A reaction mixture containing the same quantities of initial reactants as Example 1, but using a petroleum ether having a boiling point range of 64°–65° C. was refluxed for 1.5 minutes. To the hot reaction mixture was added 2 ml. of 2,4,6-collidine and, following the usual procedure (Example 1), a yield of 3.54 g. of 50.4% pure 7-dehydrocholesteryl benzoate was obtained. This was a yield of 36.6%.

Example 7

The procedure of Example 1 was followed except that the refluxing time of the bromination procedure was 10 minutes instead of 30 minutes. Two and eight tenths g. of 7-dehydrocholesteryl benzoate was obtained which was 70.2% pure. This was a yield of 40.3%.

Example 8

When using petroleum ether having a boiling point of 45° C., refluxing the initial reaction mixture for 20 minutes and continuing the procedure as given in Example 1, the yield of product obtained was 3.14 g. of 51.5% purity. This represented a yield of 33.2%.

Example 9

A further experiment was carried out using the same quantities of reactants as in Example 1, but using as a solvent petroleum ether having a boiling point range of 70°–75° C. The refluxing time was 4 minutes and the remaining conditions were essentially those of Example 1. The yield was 2.81 g. of 61% purity, representing a yield of 35.2%.

Example 10

A mixture of 4.9 g. (0.01 mol) cholesteryl benzoate, 2.14 g. (0.012 mol) N-bromosuccinimide and 50 ml. of petroleum ether, boiling point 64°–65° C. (purified by shaking successively with concentrated sulfuric acid and acidic potassium permanganate) was refluxed and irradiated for 4 minutes in usual manner with two photospots, RSP-2, 115 v., (G. E. Co.). To the refluxing mixture was added 2 ml. of 2,4,6-collidine; the mixture was cooled and filtered and the filtrate was added dropwise over a period of 13 minutes to 35 ml. of refluxing xylene containing 1 ml. of 2,4,6-collidine. This gave a flash distillation of the petroleum ether. Then 10 ml. more of xylene were added and the mixture was refluxed for 10 minutes, cooled, treated with anhydrous magnesium sulfate and filtered through diatomaceous earth. The filtrate was evaporated in vacuo and gave a mixture of oil and solid which was worked up with acetone. The solid was collected by filtration and was washed with acetone. A yield of 3.21 g. of 7-dehydrocholesteryl benzoate was obtained which on ultra-violet analysis showed a 56.6% pure product. This was a yield of 37.3%. The product produced a cloudy melt at 118° to 125° C. which cleared at 151° C.

*Example 11*

To 200 ml. of petroleum ether (boiling point 64°–65° C., purified with concentrated sulfuric acid and acidic potassium permanganate) was added 17.12 g. (0.04 mol) cholesteryl acetate and 8.56 g. (0.048 mol) of N-bromosuccinimide and the mixture was heated to reflux by means of two photospot lamps. The mixture was refluxed for 4 minutes with the lamps as the only source of heat. At the end of the reflux period, while the mixture was still boiling, 8 ml. of 2,4,6-collidine was added. The mixture was cooled and filtered. The filtrate was evacuated in vacuo in an atmosphere nitrogen with the temperature maintained at room temperature or slightly below. The residue was treated with about one half of 100 ml. of xylene containing 4 ml. of 2,4,6-collidine and the distillation was continued for a short time to insure removal of traces of the petroleum ether. The remainder of the collidine-xylene mixture was added. The mixture was refluxed for 15 minutes in an atmosphere of nitrogen, cooled and treated with water. The product was worked up in xylene and the extract was washed successively with cold, very dilute hydrochloric acid, water, sodium bicarbonate and water. The extract was dried with anhydrous magnesium sulfate, treated with activated charcoal and filtered through diatomaceous earth. Evaporation of the brown-yellow xylene solution in a nitrogen atmosphere gave an oil solid which was dissolved in acetone. The solution was put under a nitrogen atmosphere and set in the refrigerator overnight. The crystals which separated were collected by filtration and were washed with a small amount of acetone, previously cooled in an alcoholic-ice bath, and then were washed with a small amount of methanol. A white solid weighing 5.78 g. was obtained, which was 90.8% pure 7-dehydrocholesteryl acetate. This was a yield of 30.8%. After two recrystallizations from an acetone-methanol mixture, 14.4 g. of substantially pure 7-dehydrocholesteryl acetate, having a melting point of 128°–129.5° C., was obtained. The overall yield of pure product was 24.4%.

We claim:

1. The process of preparing a 7-dehydrocholesteryl ester which comprises heating and illuminating a mixture of a cholesteryl ester and N-bromosuccinimide in a saturated hydrocarbon solvent for a period of from 30 seconds to 1 hour, adding to the hot mixture a tertiary amine, cooling said mixture, filtering, removing said hydrocarbon solvent in vacuo, dissolving the brominated cholesteryl ester in a stable hydrocarbon solvent having a boiling point range between 100° and 150° C. in the presence of a tertiary amine, heating the mixture to within the range of 100° to 150° C. for from 5 minutes to 2 hours, removing said tertiary amine in the form of its acid salt and recovering the 7-dehydrocholesteryl ester.

2. The process of preparing a 7-dehydrocholesteryl ester which comprises heating and illuminating a mixture of a cholesteryl ester and N-bromosuccinimide in a saturated hydrocarbon solvent for a period of from 30 seconds to 1 hour, adding to the hot mixture a tertiary amine, cooling said mixture, filtering, removing said hydrocarbon solvent in vacuo, dissolving the brominated cholesteryl ester in xylene in the presence of a tertiary amine, heating the mixture to within the range of 100° to 150° C. for from 5 minutes to 2 hours, removing said tertiary amine in the form of its acid salt and recovering the 7-dehydrocholesteryl ester.

3. The process of preparing a 7-dehydrocholesteryl ester which comprises heating and illuminating a mixture of a cholesteryl ester and N-bromosuccinimide in petroleum ether for a period of from 30 seconds to 1 hour, adding to the hot mixture a tertiary amine, cooling said mixture, filtering, removing said petroleum ether in vacuo, dissolving the brominated cholesteryl ester in a stable hydrocarbon solvent having a boiling point range between 100° and 150° C. in the presence of a tertiary amine, heating the mixture to within the range of 100° to 150° C. for from 5 minutes to 2 hours, removing said tertiary amine in the form of its acid salt and recovering the 7-dehydrocholesteryl ester.

4. The process of preparing 7-dehydrocholesteryl benzoate which comprises heating and illuminating a mixture of cholesteryl benzoate and N-bromosuccinimide in a saturated hydrocarbon solvent for a period of from 30 seconds to 1 hour, adding to the hot mixture a tertiary amine, cooling said mixture, filtering, removing said hydrocarbon solvent in vacuo, dissolving the brominated cholesteryl benzoate in a stable hydrocarbon solvent having a boiling point range between 100° and 150° C. in the presence of a tertiary amine, heating the mixture to within the range of 100° to 150° C. for from 5 minutes to 2 hours, removing said tertiary amine in the form of its acid salt and recovering the 7-dehydrocholesteryl benzoate.

5. The process of preparing 7-dehydrocholesteryl acetate which comprises heating and illuminating a mixture of cholesteryl acetate and N-bromosuccinimide in a saturated hydrocarbon solvent for a period of from 30 seconds to 1 hour, adding to the hot mixture a tertiary amine, cooling said mixture, filtering, removing said hydrocarbon solvent in vacuo, dissolving the brominated cholesteryl acetate in a stable hydrocarbon solvent having a boiling point range between 100° and 150° C. in the presence of a tertiary amine, heating the mixture to within the range of 100° to 150° C. for 5 minutes to 2 hours, removing said tertiary amine in the form of its acid salt and recovering the 7-dehydrocholesteryl acetate.

6. The process of preparing 7-dehydrocholesteryl benzoate which comprises heating and illuminating with an electrical light source, a mixture of cholesteryl benzoate and N-bromosuccinimide in petroleum ether for a period of from 30 seconds to 1 hour, adding to the hot mixture a tertiary amine, cooling said mixture, filtering, removing said petroleum ether in vacuo, dissolving the brominated cholesteryl benzoate in xylene in the presence of a tertiary amine, heating the mixture to within the range of 100° to 150° C. for from 5 minutes to 2 hours, removing said tertiary amine in the form of its acid salt and recovering the 7-dehydrocholesteryl benzoate.

7. The process of preparing 7-dehydrocholesteryl acetate which comprises heating and illuminating with an electrical light source, a mixture of cholesteryl acetate and N-bromosuccinimide in petroleum ether for a period of from 30 seconds to 1 hour, adding to the hot mixture dimethylaniline, cooling said mixture, filtering, removing said petroleum ether in vacuo, dissolving the brominated cholesteryl acetate in xylene in the presence of dimethylaniline, heating the mixture to within the range of 100° to 150° C. for from 5 minutes to 2 hours, removing said dimethylaniline in the form of its hydrobromide salt and recovering the 7-dehydrocholesteryl acetate.

8. The process of preparing 7-dehydrocholesteryl benzoate which comprises heating and illuminating with an electrical light source, a mixture of cholesteryl benzoate and N-bromosuccinimide in petroleum ether for a period of from 30 seconds to 1 hour, adding to the hot mixture 2,4,6-collidine, cooling said mixture, filtering, removing said petroleum ether in vacuo, dissolving the brominated cholesteryl benzoate in xylene in the presence of 2,4,6-collidine, heating the mixture to within the range of 100° to 150° C. for from 5 minutes to 2 hours, removing said 2,4,6-collidine in the form of its hydrobromide salt and recovering the 7-dehydrocholesteryl benzoate.

SEYMOUR BERNSTEIN.
KARL J. SAX.

REFERENCES CITED

The following references are of record in the file of this patent:

UNITED STATES PATENTS

| Number | Name | Date |
|---|---|---|
| 2,441,091 | Vliet | May 4, 1948 |

FOREIGN PATENTS

| Number | Country | Date |
|---|---|---|
| 574,432 | Great Britain | Jan. 4, 1946 |